US009226869B2

(12) United States Patent
Van Houtem et al.

(10) Patent No.: US 9,226,869 B2
(45) Date of Patent: Jan. 5, 2016

(54) HEIGHT ADJUSTMENT DEVICE FOR A HANDLE OF A ROLLATOR

(75) Inventors: Jos Van Houtem, Grimslov (SE); Tobias Nilsson, Ljungby (SE)

(73) Assignee: INVACARE INTERNATIONAL SARL, Gland (CH)

( * ) Notice: Subject to any disclaimer, the term of this patent is extended or adjusted under 35 U.S.C. 154(b) by 0 days.

(21) Appl. No.: 14/384,428

(22) PCT Filed: Mar. 13, 2012

(86) PCT No.: PCT/IB2012/051172
§ 371 (c)(1),
(2), (4) Date: Dec. 2, 2014

(87) PCT Pub. No.: WO2013/136116
PCT Pub. Date: Sep. 19, 2013

(65) Prior Publication Data
US 2015/0130166 A1 May 14, 2015

(51) Int. Cl.
*B62B 3/02* (2006.01)
*A61H 3/04* (2006.01)

(52) U.S. Cl.
CPC .......... *A61H 3/04* (2013.01); *A61H 2201/0161* (2013.01); *A61H 2201/0192* (2013.01)

(58) Field of Classification Search
CPC ............. A61H 3/00; A61H 3/04; A61G 5/10; B62B 3/02; B62B 5/00; B62B 5/06; B62B 5/067
USPC ........... 280/638, 655.1, 47.34, 47.36; 135/65, 135/67, 75, 76
See application file for complete search history.

(56) References Cited

U.S. PATENT DOCUMENTS 5,228,202 A * 7/1993 Liao ......................... B25G 1/04 15/144.4
5,542,150 A * 8/1996 Tu ........................ A45C 13/123 16/113.1
6,886,575 B2 * 5/2005 Diamond ................. A45B 7/00 135/67
2005/0211285 A1 9/2005 Cowie et al.

FOREIGN PATENT DOCUMENTS

CN 201404413 2/2010
EP 2343035 7/2011
WO 2007117884 A2 10/2007

OTHER PUBLICATIONS

International Search Report and Written Opinion from PCT/IB2012/051172 dated Nov. 9, 2012.

* cited by examiner

*Primary Examiner* — John Walters
(74) *Attorney, Agent, or Firm* — Calfee, Halter & Griswold LLP

(57) ABSTRACT

The invention concerns a height adjustment device (1) for a handle (4) of a rollator, comprising: —an inner tube (2) telescopically received in an outer tube (3), the handle (4) of the rollator being connected at the upper end of said inner tube (2), —a locking assembly (10) adapted to lock the inner tube (2) in a fixed position with regard to the outer tube (3), —an unlocking assembly (20) adapted to unlock the inner tube (2) from said fixed position.

16 Claims, 2 Drawing Sheets

HEIGHT ADJUSTMENT DEVICE FOR A HANDLE OF A ROLLATOR

RELATED APPLICATIONS

The present application is the U.S. national phase entry of PCT/IB2012/051172, filed on Mar. 13, 2012, the entire disclosure of which is fully incorporated herein by reference.

FIELD OF THE INVENTION

The present invention relates to a height adjustment device for a handle of a rollator.

The present invention relates also to a rollator comprising height adjustable handles wherein each handle is adjusted through a height adjustment device.

Finally, the present invention relates to a method for adjusting and memorizing a desired height of a handle of a rollator using a height adjustment device.

BACKGROUND OF THE INVENTION

Certain health conditions hinder vertical balance, and movement in the upright position or other mechanics of walking. The health care industry has developed aids for those who suffer from such conditions, including crutches, walkers, rollators, and wheelchairs. Rollators are wheeled supports which aid individuals who have function in their lower limbs, but lack the muscular control, strength or balance to enable them to walk unassisted. It is advantageous for such supports to include two pairs of wheels in order to avoid the need to lift the device, and to facilitate its use as an ambulatory aid. Further, these devices may include a seat so that a user may use the device to sit and rest.

Conventional rollators may also comprise height adjustable handles. These height adjustable handles permit to adapt the rollator to the needs of the user.

In the document US 2005/0211285, the handles are mounted on the ends of uprights telescopically adjustable in the main frame of the rollator. The adjustment of the handle height consists in removing and repositioning screws inside corresponding holes provided in the uprights and the main frame. This procedure is generally long and boring, and involves appropriate tools for removing the screws. Another disadvantage of this known rollator is the impossibility for a user to memorize a desired handle height corresponding to its needs. Thus, one user has no choice but to repeat the same handle height adjusting procedure every time he uses the rollator after a storage period, during which the handles of the rollator are generally positioned in their lowest position.

One aim of the present invention is therefore to provide a height adjustment device for a handle of a rollator, wherein the drawbacks mentioned above is avoided.

SUMMARY OF THE INVENTION

In this view, the present invention is concerned with a height adjustment device as claimed in claim 1. Important features of the device are defined in the dependent claims.

Thanks to the features of the invention, the height of the handles may be easily and quickly adjusted.

Furthermore, the user has the possibility to memorize a desired height so as to avoid repeating the same handle height adjusting procedure every time he uses the rollator.

BRIEF DESCRIPTION OF THE DRAWINGS

Other features and advantages of the present invention will appear more clearly from the detailed description of one embodiment of the invention which is presented solely by way of a non-restricted example and illustrated by the attached drawings in which.

DETAILED DESCRIPTION OF EMBODIMENTS OF THE INVENTION

Figure 1:
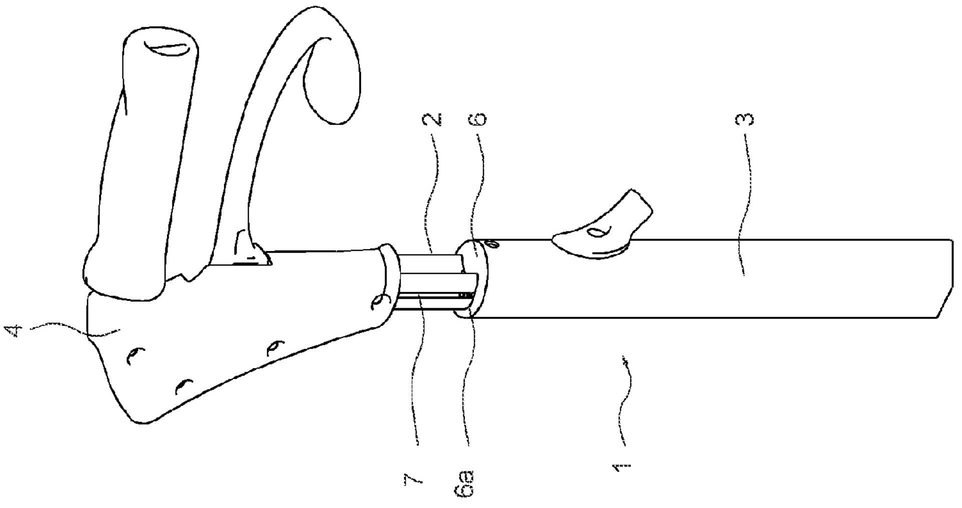
FIG. 1 is a perspective view of a handle of a rollator provided with a height adjustment device according the present invention.

In reference to FIG. 1, a height adjustment device conform to the present invention is shown.

The height adjustment device 1 comprises an inner tube 2 telescopically received in an outer tube 3, the handle 4 of the rollator being connected at the upper end of said inner tube 2. The outer tube 3 may be connected to the main frame of the rollator or, preferably, may define one upright of said main frame. This illustration does not reveal the locking and unlocking assemblies permitting, respectively, to lock the inner tube 2 in a fixed position with regard to the outer tube 3 and to unlock said inner tube 2 from said fixed position because they are partially lodged inside the outer tube 3. As better explained in the following paragraphs, such assemblies may not be limited to the embodiment shown on FIGS. 2*a*, 2*b*.

Figure 2B:
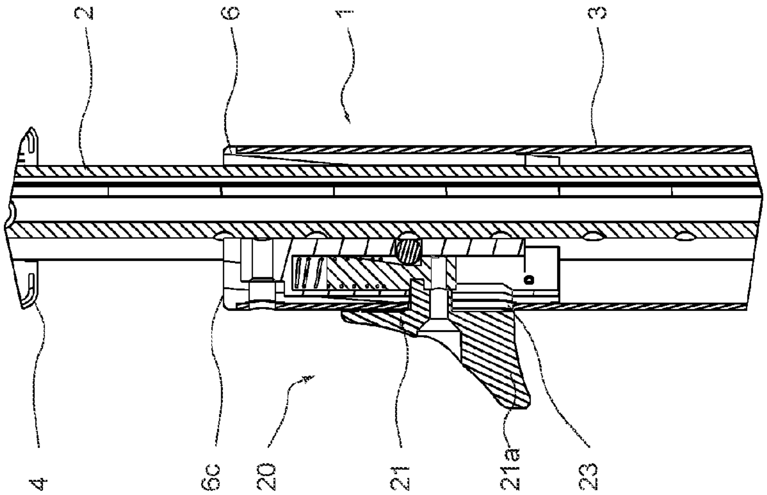
FIGS. 2*a* and 2*b* are vertical section views of the handle of FIG. 1, respectively in locked and unlocked positions.
Figure 2A:
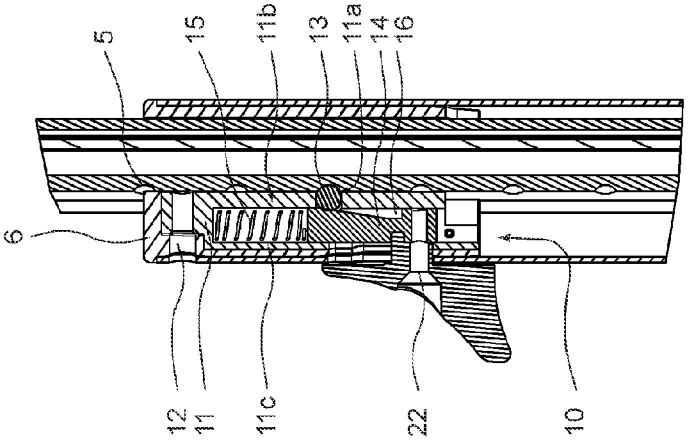

In reference to FIGS. 2*a* and 2*b*, a first embodiment of the height adjustment device of FIG. 1 is shown.

In this embodiment, the external surface of the inner tube 2 is provided with a plurality of semispherical recesses 5, said recesses being spaced-apart along the periphery of the inner tube and being aligned in the axial direction of said inner tube. A locking assembly 10 comprises a housing 11 fixedly connected to the outer tube 3 through a screw 12 and disposed in a gap between the inner tube 2 and the outer tube 3, a locking ball 13 at least partially received in a through hole 11*a* formed through a longitudinal flange 11*b* of the housing 11 between the external surface of the housing 11 and an central opening 11*c* formed inside the housing 11, and a sliding piece 14 slidably received inside said opening 11*c*, said sliding piece 14 being urged outside of the opening 11*c* by means of a spring 15 disposed inside the opening 11*c*, one end of said spring 15 abutting against the bottom of the opening 11*c* and the other end abutting against the upper face of the sliding piece 14. In the embodiment shown, the opening 11*c* and the sliding piece 14 define approximately a cylindrical shape, the sliding piece 14 being slidably movable inside the opening 11*c* along a direction approximately parallel to the axis of the inner tube 2. The expressions "axial direction" or "axially" will be used thereafter so as to characterize all directions approximately parallel to the axis of the inner tube 2. In addition, the sliding piece 14 comprises a cavity 16 formed at its periphery, said cavity 16 being adapted to receive at least partially the locking ball 13.

Thus configured, the locking assembly 10 permits, respectively, to lock and unlock the inner tube 2 in and from its fixed position with regard to the outer tube 3 depending on the position of the sliding piece 14 inside the opening 11*c*.

In particular, in a first position of the sliding piece 14, thereafter defined as the "locking" position, illustrated in FIG. 2*a*, the sliding piece 14 is positioned downwards under the action of the spring 15 so that the cylindrical periphery of the sliding piece exerts a radially inward force on the locking ball 13 such that said locking ball 13 is pushed outside of the through hole 11*a*. The expression "radially inward" or "radially outward" refers to a direction oriented from the periphery of the outer tube 3 to the center of said outer tube 3, or inversely. Thus, when the through hole 11*a* is aligned with a semispherical recess 5 of the inner tube 2, the locking ball 13 is pushed inside said semispherical recess 5 when the sliding piece 14 is in its locking position. In this configuration, the locking ball 13 extends both in the through hole 11*a* and the semispherical recess 5 and prevents the axial displacement of the inner tube 2 along the outer tube 3.

In a second position of the sliding piece 14, thereafter defined as the "unlocking" position, illustrated in FIG. 2*b*, the sliding piece 14 is positioned upwards against the action of the spring 15 so that the cavity 16 is aligned with the through hole 11*a*. Thus, the locking ball 14 may at least partially be received in the cavity 16 such that the locking ball 14 does not protrude from the periphery of the housing 11. In this configuration, the locking ball 14 does not prevent the axial displacement of the inner tube 2 along the outer tube 3. In a preferred embodiment, the cavity 16 is formed with an upper portion inclining towards the outer surface of the sliding piece 14 so as to permit a progressive displacement of the locking ball 13.

The displacement of the sliding piece 14 from its locking position to its unlocking position is done by the unlocking assembly 20.

In the embodiment shown, the unlocking assembly 20 comprises a driving piece 21 fixedly connected to the sliding piece 14 through a screw 22, said driving piece 21 extending through a slit 23 formed in the outer tube 3 such that said driving piece 21 protudes from the periphery of said outer tube 3. In particular, a grip 21*a* integral with said driving piece 21 may be actuated by the hand of a user so as to axially move the driving piece 21 from a lower position in which said driving piece 21 abuts against a lower end of the slit 23, said lower position corresponding to the locking position of the sliding piece 14, to an upper position in which said driving piece 21 abuts against an upper end of the slit 23, said upper position corresponding to the unlocking position of the sliding piece 14.

The height adjustment device 1 comprises also an upper sleeve 6 partially disposed in the gap between the inner tube 2 and the outer tube 3, said upper sleeve 6 being fixedly connected at the upper part of the outer tube 3 through the screw 12. The upper sleeve 6 is configured so as to keep constant the distance between the inner tube 2 and the outer tube 3. In particular, as shown on FIGS. 1 and 4*d*, the upper sleeve 6 comprises a cut-out 6*a* formed in its upper face, said cut-out 6*a* being adapted to slidably receive the inner tube 2. In the preferred embodiment shown, this cut-out 6*a* has sensitively the same shape as the cross section of the inner tube 2. To prevent the inner tube 2 from rotating around its axis, which could lead to a bad alignment between the through hole 11*a* and the semispherical recesses 5, in particular when the sliding piece 14 is in its unlocking position, the cut-out 6*a* may have a shape chosen among a polygon, an ellipse and any other closed curve except a circle.

The height adjustment device according to the invention may also comprise an abutment means so as to enable the user to find automatically a desired handle height after the handle has been lowered in its storage position. This abutment means could be used in the embodiment of FIGS. 1, 2*a* and 2*b*, but could also be adapted to other embodiments revealing only the features of independent claim 1 and dependent claim 5.

In a first embodiment (not shown), the abutment means consists in a pin integral with the inner tube 2, said pin extending radially outward from the periphery of said inner tube 2 such that said pin abuts against a lower face 6*b* of the upper sleeve 6 when the handle 4 and the inner tube 2 are positioned in their highest position corresponding to the desired handle height. In this embodiment, the abutment means can not be easily adapted to the needs of the user.

In the embodiment shown in FIGS. 3, 4*a* to 4*d*, the abutment means 30 comprises an elongated element 31 slidably received in an axial groove 7 provided at the periphery of the inner tube 2, said elongated element 31 having a lower part to which is fixedly connected a pin 32, said pin extending radially outward from the periphery of the inner tube 2, and an upper part inside which is formed a threaded through hole 33, said through hole extending in a direction approximately orthogonal to an axial direction and being adapted to receive a screw 34, said screw removably connecting the elongated element 31 to the inner tube 2 when it is tightened.

The method for adjusting and memorizing a desired height for the handle of a rollator is explained in the following paragraph in relation with FIGS. 4*a* to 4*c*.

Figure 4C:
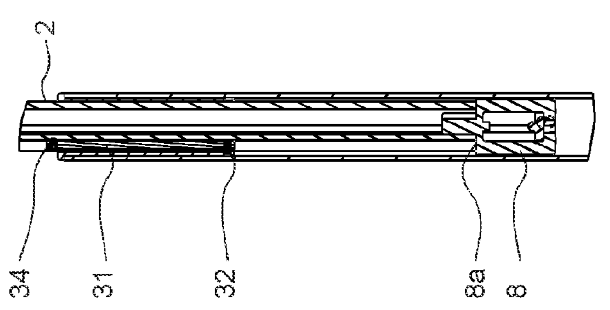
FIGS. 4*a*, 4*b* and 4*c* are vertical section views of the handle of FIG. 3, respectively in rest, adjusting and locked positions of the abutment means.
Figure 4D:
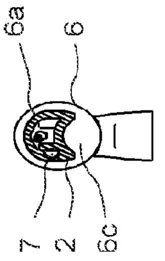
FIG. 4*d* is a cross section view of the handle of FIG. 3.
Figure 4B:
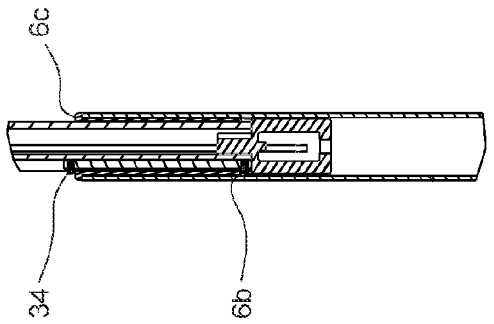
Figure 4A:
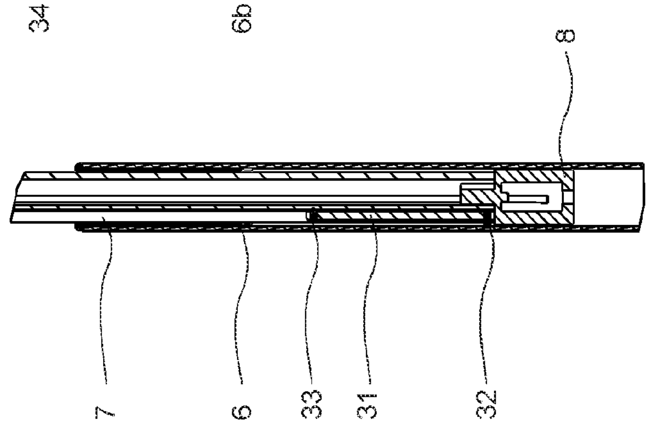
Figure 3:
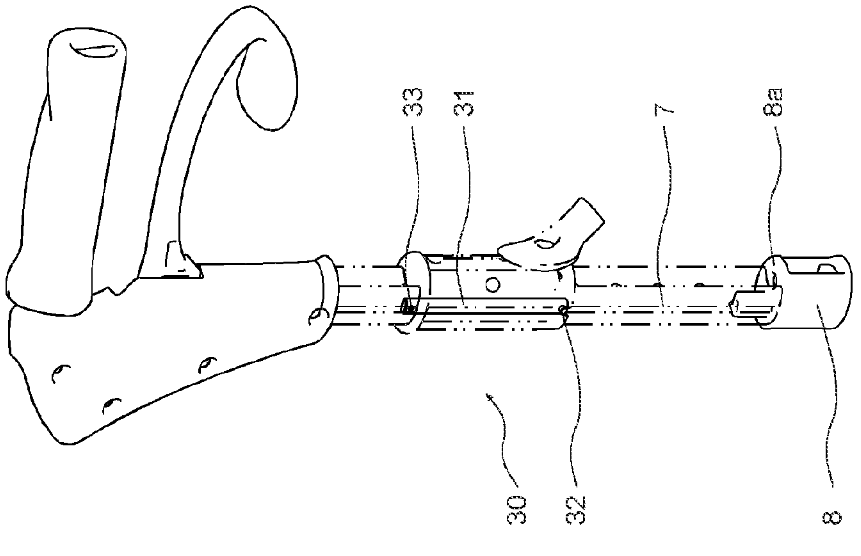
FIG. 3 is a similar view to FIG. 1 showing by transparency an abutment means lodged inside the outer tube.

In FIG. 4*a*, the handle 4 has been moved from its storage position, in which, for instance, the lower end of the handle 4 abuts against the upper face 6*c* of the upper sleeve 6, to an intermediate position in which the elongated element 31 has been moved toward the upper part of the outer tube 3. This displacement is possible on the condition that the inner tube 2 is unlocked and the screw 34 does not protrude radially outward from the periphery of the inner tube 2. When no desired handle height has been memorized, the elongated element 31 is disconnected from the inner tube 2 and abuts against an upper face 8*a* of a lower sleeve 8 connected at the lower end of the inner tube 2 and slidably received inside the outer tube 3. Such a configuration may occur for example when the length of the screw 34 is less than or approximately equal to the length of the through hole 33.

In FIG. 4*b*, the handle 4 has been moved from the intermediate position of FIG. 4*a* to its highest position, in which the pin 32 abuts against a lower face 6*b* of the upper sleeve 6. Thereafter, the inner tube 2 has been locked in said highest position through the locking assembly 20. In this position, the through hole 33 is positioned just above the upper face 6*c* of said upper sleeve 6. Such a configuration may occur for example when the distance separating the pin 32 and the through hole 33 is slightly higher than the distance separating said lower and upper faces 6*b*, 6*c* of the upper sleeve 6. Thus, in this position, the user may tighten the screw 34 so as to connect the elongated element 31 to the inner tube 2. However, before tightening said screw 34, the user must adjust the handle height to the desired height. Accordingly, he untightens the screw 34 until said screw protrudes radially outward from the periphery of the inner tube 2. Thus, the screw 34 abuts against the upper face 6*c* of the upper sleeve 6, preventing the elongated element 31 to move downwards.

In FIG. 4*c*, the handle 4 has been moved from its highest position to a final position, in which the desired height is reached. This displacement is possible on the condition that the inner tube 2 has been unlocked beforehand through the unlocking assembly 30. When the desired height is reached, the inner tube 2 is locked through the locking assembly 20 and the screw 34 is tightened so as to connect the elongated element 31 to the inner tube 2. Thus, the user has memorized this final position and can automatically adjust the handle height to the desired height each time he moves the inner tube 2 to its highest position, the elongated element 31 being connected to the inner tube 2.

The invention claimed is:

1. Height adjustment device for a handle of a rollator, comprising:

an inner tube telescopically received in an outer tube, the handle of the rollator being connected at an upper end of said inner tube, a locking assembly adapted to lock the inner tube in a fixed position with regard to the outer tube, an unlocking assembly adapted to unlock the inner tube from said fixed position, wherein an upper part of the outer tube is connected to an upper sleeve, said upper sleeve being configured so as to keep constant the distance between the inner tube and the outer tube, and wherein the inner tube is movable inside the outer tube between a lowest position and a highest position, wherein in the highest position an abutment means at least temporarily integral with the inner tube abuts against a lower face of the upper sleeve.

2. Height adjustment device according to claim 1, wherein an external surface of the inner tube is provided with a plurality of semispherical recesses and the locking assembly comprises:

a housing fixedly connected to the outer tube and disposed in a gap formed between the inner tube and the outer tube, said housing comprising a longitudinal flange adjacent to the inner tube, said longitudinal flange comprising a through hole adapted to receive at least partially a locking ball, and a sliding piece slidably movable inside an opening of the housing between a locking position, in which the sliding piece exerts a radially inward locking force on the locking ball so as to push said locking ball inside one of the semispherical recesses of the inner tube, and an unlocking position, in which a cavity formed in the external surface of the sliding piece is adapted to receive at least partially the locking ball.

3. Height adjustment device according to claim 2, wherein the unlocking assembly comprises a driving piece fixedly connected to the sliding piece, said driving piece extending through a slit formed in the outer tube so as to be actuated by the hand of a user, said slit being configured so as to permit the sliding displacement of said driving piece between a first position corresponding to the locking position of the sliding piece and a second position corresponding to the unlocking position of the sliding piece.

4. Height adjustment device according to claim 1, wherein the locking assembly comprises a spring disposed inside the opening of the housing, a first end of said spring abutting against the housing and a second end end of said spring abutting against the sliding piece such that the sliding piece is moved from an unlocking position to a locking position by the spring.

5. Height adjustment device according to claim 1, wherein the upper sleeve comprises a cut-out formed inside an upper face of the upper sleeve, said cut-out being adapted to receive the inner tube.

6. Height adjustment device according to claim 5, wherein the cut-out has substantially the same shape as the cross section of the inner tube.

7. Height adjustment device according to claim 6, wherein the cut-out is configured so as to prevent the inner tube from rotating around an axis of the inner tube.

8. Height adjustment device according to claim 7, wherein the cut-out has a shape comprising at least one of a polygon, an ellipse and any other closed curve except a circle.

9. Height adjustment device according to claim 1, wherein in the lowest position of the inner tube, a lower end of the handle of the rollator abuts against an upper face of the upper sleeve.

10. Height adjustment device according to claim 9, wherein the abutment means consists in a pin integral with the inner tube, said pin extending radially outward from the periphery of the inner tube.

11. Height adjustment device according to claim 9, wherein the abutment means includes an elongated element adapted to be slidably received in an axial groove provided at the periphery of the inner tube, said elongated element having a lower part to which is fixedly connected a pin, said pin extending radially outward from the periphery of the inner tube, and an upper part inside which is formed a threaded through hole, said through hole extending in a direction approximately orthogonal to an axial direction and being adapted to receive a screw so as to removably connect the elongated element to the inner tube.

12. Height adjustment device according to the claim 11, wherein the length of the screw is less than or approximately equal to the length of the through hole such that the screw does not protrude radially outward from the periphery of the inner tube when the elongated element is connected to the inner tube and may protrude radially outward from the periphery of the inner tube when the elongated element is disconnected from the inner tube.

13. Height adjustment device according to claim 12, wherein the distance separating the pin and the through hole of the elongated element in the axial direction is slightly higher than the distance separating the lower and upper face of the upper sleeve such that said through hole is positioned just above the upper face of the upper sleeve when said pin abuts against the lower face of the upper sleeve.

14. Height adjustment device according to claim 13, wherein a lower sleeve is connected at the lower end of the inner tube, said lower sleeve being slidably received inside the outer tube and comprising an upper face against which abuts the elongated element when it is disconnected from the inner tube and when the screw does not protrude radially outward from the periphery of the inner tube.

15. Method for adjusting and memorizing a desired height of a handle of a rollator using a height adjustment device according to claim 14, said method comprising the steps of:

displacement of the handle so as to move the inner tube in the highest position thereof, the elongated element being disconnected from the inner tube and resting on the upper face of the lower sleeve, locking of the inner tube in the highest position thereof through the locking assembly, unscrewing of the screw lodged inside the through hole of the elongated element until said screw protrudes radially outward from the periphery of the inner tube, unlocking of the inner tube through the unlocking assembly, displacement of the handle until the desired height is reached, said screw abutting against the upper face of the upper sleeve, locking of the inner tube through the locking assembly, screwing of said screw so as to connect the elongated element to the inner tube.

16. Rollator comprising height adjustable handles wherein each handle is adjusted through a height adjustment device according to claim 1.

* * * * *